(12) United States Patent
Nobelen et al.

(10) Patent No.: US 9,887,058 B2
(45) Date of Patent: Feb. 6, 2018

(54) POWER SUPPLY CIRCUIT

(71) Applicant: SNECMA, Paris (FR)

(72) Inventors: Florent Nobelen, Paris (FR); Olivier Herget, Paris (FR)

(73) Assignee: SNECMA, Paris (FR)

( * ) Notice: Subject to any disclaimer, the term of this patent is extended or adjusted under 35 U.S.C. 154(b) by 559 days.

(21) Appl. No.: 14/418,754

(22) PCT Filed: Jul. 24, 2013

(86) PCT No.: PCT/FR2013/051781
§ 371 (c)(1),
(2) Date: Jan. 30, 2015

(87) PCT Pub. No.: WO2014/020262
PCT Pub. Date: Feb. 6, 2014

(65) Prior Publication Data
US 2015/0179383 A1 Jun. 25, 2015

(30) Foreign Application Priority Data
Aug. 2, 2012 (FR) ..................... 12 57550

(51) Int. Cl.
*H01H 37/00* (2006.01)
*H01H 37/32* (2006.01)
(Continued)

(52) U.S. Cl.
CPC .......... *H01H 89/04* (2013.01); *H01H 37/002* (2013.01); *H01H 37/32* (2013.01);
(Continued)

(58) Field of Classification Search
USPC ........................................... 307/9.1
See application file for complete search history.

(56) References Cited

U.S. PATENT DOCUMENTS 3,188,529 A  6/1965 Byrnes et al.
3,303,391 A * 2/1967 Kitami .................. H02H 5/042
                                                 327/512
(Continued)

FOREIGN PATENT DOCUMENTS

GB  648 790  1/1951
GB  1 111 240  4/1968

OTHER PUBLICATIONS

International Search Report dated Jan. 17, 2014 in PCT/FR13/051781 Filed Jul. 24, 2013.

*Primary Examiner* — Rexford Barnie
*Assistant Examiner* — Xuan Ly
(74) *Attorney, Agent, or Firm* — Oblon, McClelland, Maier & Neustadt, L.L.P.

(57) ABSTRACT

A power supply circuit for electronic equipment that might be affected by overheating or by a fire, the power supply circuit including a bistable switch switchable between a first state in which the input terminal is connected to the output terminal, and a second state in which the input terminal is not connected to the output terminal, a first coil, and a second coil, the bistable switch being configured to switch to the first state when the magnetic field induced by the second coil is greater than the magnetic field induced by the first coil, and to switch to the second state when the magnetic field induced by the first coil is greater than the magnetic field induced by the second coil.

6 Claims, 2 Drawing Sheets

(51) Int. Cl.
*H01H 47/22* (2006.01)
*H01H 89/04* (2006.01)
*H02H 5/04* (2006.01)

(52) U.S. Cl.
CPC ............ *H01H 47/226* (2013.01); *H02H 5/04* (2013.01); *Y10T 307/76* (2015.04)

(56) References Cited

U.S. PATENT DOCUMENTS 4,418,374 A   11/1983  Callan
8,000,079 B2   8/2011  Lin

\* cited by examiner

POWER SUPPLY CIRCUIT

BACKGROUND OF THE INVENTION

The present invention relates to the general field of electrical power supply circuits. The invention relates more precisely to a power supply circuit for electronic equipment that might be affected by overheating or by a fire, e.g. an electronic card of an aeroengine computer.

Document FR 2 957 667 describes a device and a method for detecting overheating affecting an aeroengine computer. When overheating is detected, the computer generates a cutoff signal having the effect of ordering closure of a fuel cutoff valve. The engine is then no longer fed with fuel, thereby making it possible to avoid the engine overspeeding in uncontrolled manner. Furthermore, the cutoff signal can have the effects of ordering actuators of the engine (other than the fuel cutoff valve) to be disconnected and of switching off their power supplies.

Nevertheless, the behavior of the computer in the event of overheating is not predictable, and it is therefore not possible to be certain that unwanted commands will not be issued to the cutoff valve, to the actuators, or to their power supplies, with the effect of causing the engine to restart.

Furthermore, if the pilot generates a computer reinitialization signal (e.g. by moving a fuel cutoff switch from an ON position to an OFF position) while the overheating is still present, then the cutoff signal is no longer generated and that too might have the effect of restarting the engine.

One potential solution is to make cutoffs irreversible.

For example, one possible lock would consist in storing information to the effect that overheating has been detected in a non-volatile memory of the computer. Thus, if the power supply to the actuators is restarted in untimely manner, and even if the fire has disappeared, the computer will once more issue an order to cut off the engine and the power supply to the actuators as a result of this information that has been saved in non-volatile memory.

Nevertheless, under such circumstances, after overheating has been detected and the engine has been cut off, the pilot has no way of restarting the engine, since the lock serves to make the cutoff irreversible. That can turn out to be very constraining in the event of the other engine of the aircraft also failing or in the event of overheating being detected in untimely manner.

There therefore exists a need for an aeroengine to be cut off in reliable manner in the event of overheating being detected, while nevertheless making it possible for the pilot to restart the engine, if necessary.

OBJECT AND SUMMARY OF THE INVENTION

The invention provides a power supply circuit for electronic equipment that might be affected by overheating or by a fire, the power supply circuit comprising:
- an input terminal for receiving a power supply voltage; and
- an output terminal for delivering the power supply voltage to the electronic equipment.

This power supply circuit is remarkable in that it comprises:
- a bistable switch switchable between a first state in which the input terminal is connected to the output terminal, and a second state in which the input terminal is not connected to the output terminal;
- a first switch controlled by a cutoff signal that is connected between the input terminal and a series circuit comprising a thermal resistor and a first coil, said series circuit lying between said first switch and a ground terminal; and
- a second switch controlled by a reinitialization signal and a second coil in series with between the input terminal and the ground terminal;

wherein, in the second state, the bistable switch connects the input terminal to the series circuit on its side remote from the ground terminal, and in the first state, the bistable switch does not connect the input terminal to the series circuit on its side remote from the ground terminal;

the bistable switch being configured to switch to the first state when the magnetic field induced by the second coil is greater than the magnetic field induced by the first coil, and to switch to the second state when the magnetic field induced by the first coil is greater than the magnetic field induced by the second coil.

Correspondingly, the invention provides an aeroengine computer comprising at least one power supply circuit of the invention and an electronic card powered by said power supply circuit.

In corresponding manner, the invention provides an aircraft including a computer in accordance with the invention and a switch operable by the pilot between a first position and a second position, wherein the power supply circuit includes a command module suitable for temporarily generating the reinitialization signal in response to a transition in the fuel cutoff signal representative of the position of the switch.

By means of these characteristics, when the electronic card is powered by the power supply circuit with the bistable switch in its first state and when overheating is detected, the first switch closes and powers the first coil, thereby having the effect of causing the bistable switch to switch to its second state, and thus cutting off the power supply to the electronic card. This avoids unwanted commands being issued by the electronic card, where such commands might have the effect of restarting the engine.

Furthermore, the cutting off of the power supply can be reversed by the pilot. By operating the switch in order to generate the reinitialization signal, the pilot can power the second coil. Depending on temperature, and thus on the resistance of the thermal resistor, the magnetic fields induced by the coils either maintain the bistable switch in its second state (if overheating is still present), or else cause it to switch to its first state (if overheating is no longer present), thereby enabling the electronic card to be powered once more.

In an embodiment, the bistable switch comprises a first portion suitable for connecting the output terminal either to a first terminal connected to the input terminal or else to a floating second terminal, and a second portion suitable for connecting a third terminal that is connected to the series circuit either to a floating fourth terminal or else to a fifth terminal that is connected to the input terminal.

In an embodiment, the power supply circuit includes a command module suitable for temporarily generating the reinitialization signal in response to a transition in a fuel cutoff signal.

In an embodiment, the electronic card includes means for detecting overheating and means for generating said cutoff signal in response to detecting overheating.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF AN EMBODIMENT

Figure 1:
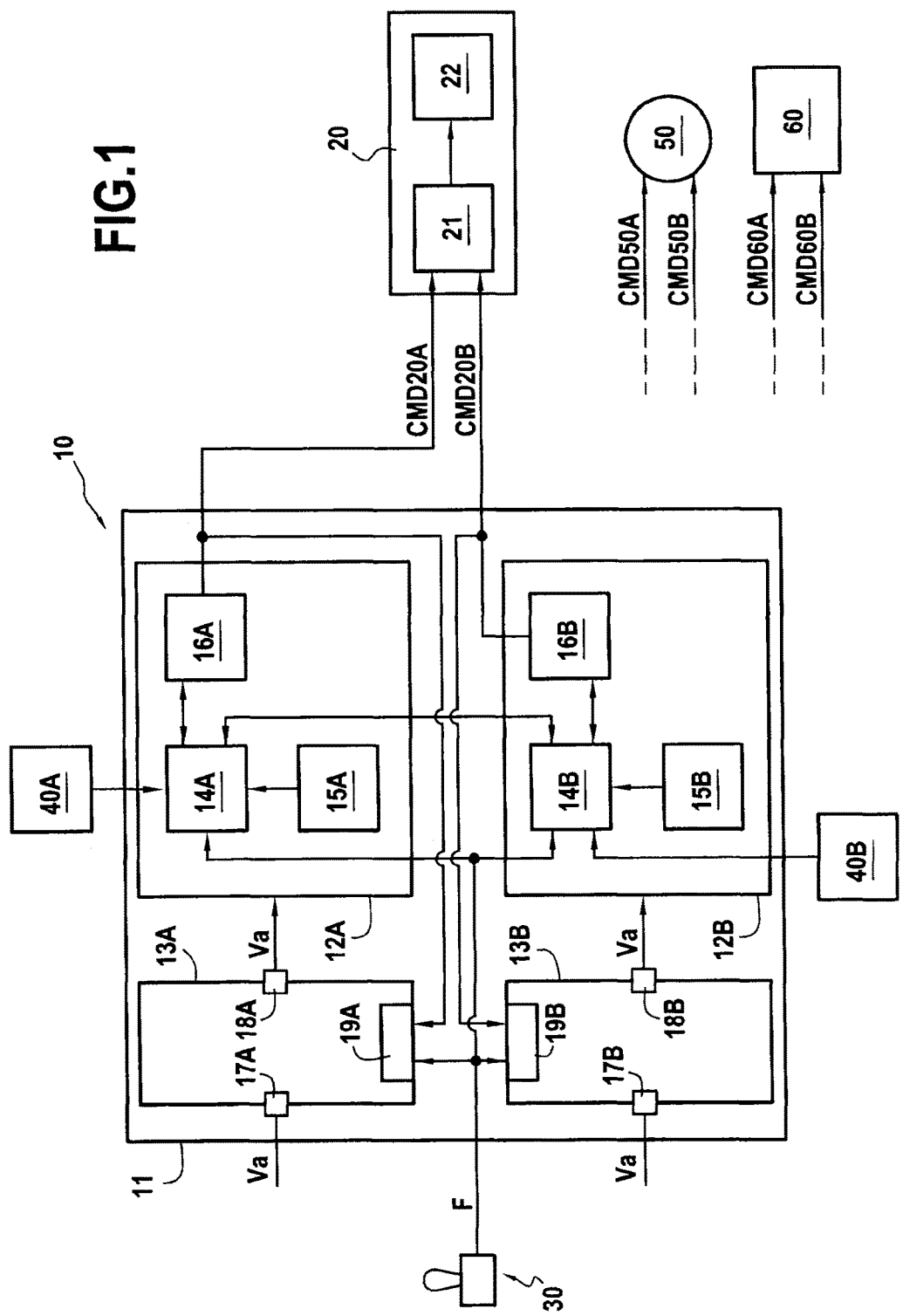
FIG. 1 is a block diagram showing, in its environment, an aeroengine computer including a power supply circuit constituting an embodiment of the invention.

FIG. 1 shows a system including a computer 10 for an aeroengine, a fuel pumping and metering unit (FPMU) 20, a fuel cutoff switch 30, overheat detector devices 40a and 40B, a converter 50, and an actuator 60.

The computer 10 comprises a housing 11 containing electronic cards 12A, 12B and power supply circuits 13A, 13B. In conventional manner, the computer 10 comprises two redundant command paths A and B in order to guarantee its continued operation, even in the event of one of its components failing.

The electronic card 12A includes in particular a command module 14A, a temperature sensor 15A, and an overspeed protection module 16A.

The command module 14A is in charge of regulating the engine. In particular, it determines a fuel flow rate setpoint and command signals for various actuators of the engine. Furthermore, depending on the signals delivered by the temperature sensor 15A and by the overheat detector devices 40A and 40B, the command module 14A may detect overheating or a fire affecting the computer 10. By way of example, detection may be performed in the manner described in above-mentioned Document FR 2 957 667.

The overspeed protection module 16A delivers a command signal CMD20A having the function of cutting off the fuel supply to the engine when the control module 14A detects overheating. Thus, the command signal CMD20A controls a servo-valve 21 for opening or closing a cutoff valve 22 of the FPMU 20.

On an input terminal 17A, the power supply circuit 13A receives a power supply voltage Va as delivered by a source that is not shown, and, via an output terminal 18A, it delivers the power supply voltage Va to the electronic card 12A. In FIG. 1, the power supply circuit 13A is shown in the housing 11 of the computer 10 as being separated from the electronic card 12A. In a variant, the power supply circuit 13A may be constituted, at least in part, by components that are to be found on the electronic card 12A. Also in a variant, the power supply circuit 13A may lie outside the housing 11, at least in part.

The power supply circuit 13A also has an interface 19A via which it receives the command signal CMD20A and a signal F representative of the position of the fuel cutoff switch 30.

In redundant manner, the electronic card 12B comprises in particular a command module 14B, a temperature sensor 15B, and an overspeed protection module 16B. The power supply circuit 13B has an input terminal 17B, an output terminal 18B, and an interface 19B.

The converter 50 generates a power supply voltage $V_0$, e.g. at +25 volts (V), derived from a source that is not shown, in order to power the actuators of the motor. Among these actuators, FIG. 1 shows an actuator 60 that may for example be a fuel metering valve (FMV).

Among the command signals determined by the computer 10, FIG. 1 shows in particular command signals CMD50A and CMD50B (as determined respectively by the paths A and B of the computer 10) having the function of switching on or off the converter 50, and command signals CMD60A and CMD60B (as determined respectively by the paths A and B of the computer 10) having the function of controlling the actuator 60.

Figure 2:
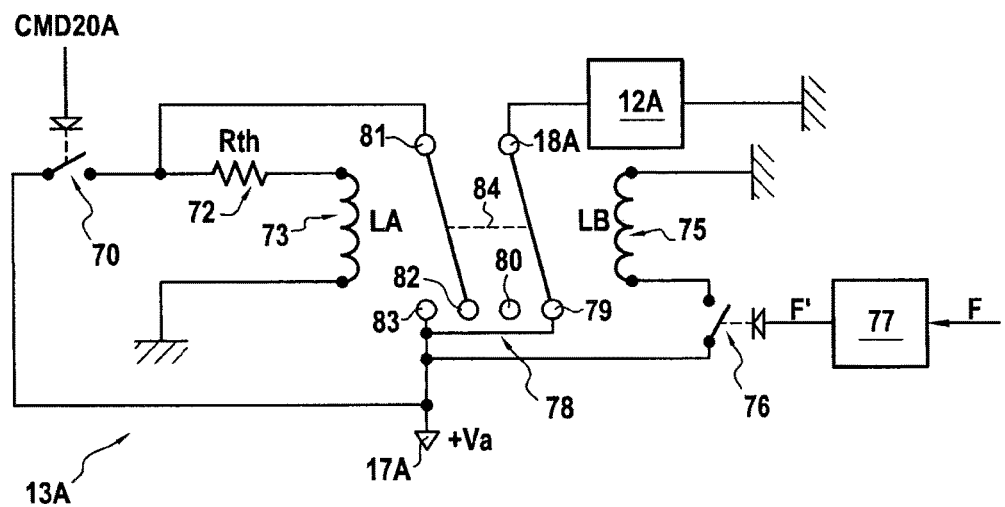
FIG. 2 is a circuit diagram showing the FIG. 1 power supply circuit.

FIG. 2 shows the power supply circuit 13A in greater detail, together with the electronic card 12A. The power supply circuit 13B may present the same structure and is therefore not described in detail.

The power supply circuit 13A comprises a switch 70, a series circuit comprising a thermal resistor 72 and coil 73 of inductance $L_A$, a coil 75 of inductance $L_B$, a switch 76, a command module 77, and a bistable switch 78.

In practice, the bistable switch 78 comprises two switches having one portion for connecting the output terminal 18A either to a terminal 79 connected to the input terminal 17A, or else to a terminal 80 that is floating, and another portion serving to connect a terminal 81 either to a floating terminal 82 or else to a terminal 83 that is connected to the input terminal 17A. The two portions switch together, as represented by dashed line 84. Thus, the bistable switch 78 has a first state, as shown in FIG. 2, in which the terminal 81 is connected to the terminal 82 and the terminal 18A is connected to the terminal 79, and a second state (not shown) in which the terminal 81 is connected to the terminal 83 and the terminal 18A is connected to the terminal 80.

The switch 70 is connected in series with the thermal resistor 72 and the coil 73 between the input terminal 17A and ground, and it is controlled by the command signal CMD20A. More precisely, when the command signal CMD20A presents a logic value corresponding to opening the cutoff valve 22, the switch 70 is open, and when the command signal CMD20A presents a logic value corresponding to closing the cutoff valve 22, the switch 70 is closed. Under such circumstances, the thermal resistor 72 and the coil 73 are powered via the switch 70.

The switch 76 is connected in series with the coil 75 between the input terminal 17A and ground, and it is controlled by the command module 77 as a function of the signal F. More precisely, by default, the command module 77 causes the switch 76 to be open. Furthermore, in response to a transition in the signal F corresponding to the switch 30 switching from the ON position to the OFF position, the command module 77 generates a reinitialization signal F' for causing the switch 76 to be closed temporarily, thereby powering the coil 75.

Finally, the terminal 81 is connected to the series circuit constituted by the thermal resistor 72 and the coil 73, on its side remote from ground, such that when the switch 78 is in its second state, the coil 73 is powered independently of whether the switch 70 is open or closed.

The thermal resistor 72 presents a resistance Rth that decreases with increasing temperature T.

The inductance $L_A$ of the coil 73 is less than the inductance $L_B$ of the coil 75: $L_A < L_B$. Furthermore, the resistance Rth of the thermal resistor 72 is dimensioned so that, at an equilibrium temperature $T_{eq}$ (e.g. 150° C.), and for a given power supply voltage Va, the magnitude of the magnetic field induced by the coil 73 is equal to the magnitude of the magnetic field induced by the coil 75.

The bistable switch 78 is configured to switch as a function of the magnetic fields induced by the coils 73 and 75. More precisely, the bistable switch 78 switches to its first state as shown in FIG. 2 if the magnetic field induced by the coil 75 is greater than the magnetic field induced by the coil 73. Conversely, the bistable switch 78 switches to its second state (not shown) if the magnetic field induced by the coil 73 is greater than the magnetic field induced by the coil 75.

FIG. 2 shows the switch 78 and the coils 73 and 75 in the form of a circuit diagram. There is no need to give a detailed structural description of them herein, since the person skilled in the art is capable of making a switch that is controlled by coils and that presents the above-described behavior.

The operation of the power supply circuit 13 is as follows.

FIG. 2 shows the nominal operation of the power supply circuit 13A. In this situation:
- the coil 73 is powered neither via the switch 70 (open) nor via the bistable switch 78 (in its first state);
- the coil 75 is not powered (switch 76 open); and
- the electronic card 12A is powered via the bistable switch 78 in its first state which connects the input terminal 17A to the output terminal 18A.

In the event of fire or of overheating, e.g. for T>180 C, the computer 10 activates the cutoff command (command signal CMD20A). In addition to closing the cutoff valve 22 having the effect of shutting down the engine, this also has the effect of closing the switch 70. Thus, the coil 73 is powered via the switch 70 (closed) and generates a magnetic field. In parallel, the switch 76 is still open. Thus, the coil 75 is not powered and does not generate a magnetic field. The magnetic field induced by the coil 73 thus has the effect of causing the bistable switch 78 to switch into its second state.

In this second state, the power supply to the electronic card 12A is cut off. Furthermore, the coil 73 is powered via the bistable switch 78 independently of whether the switch 70 is open or closed.

Since the power supply to the electronic card 12A is cut off, the computer 10 cannot issue unwanted command signals that might have the effect of reigniting the engine. Furthermore, powering the coil 73 via the bistable switch 78 makes it possible to guarantee that cutoff is irreversible so long as overheating continues to be present. In addition, cutoff is reversible by the pilot after overheating has disappeared.

If the pilot moves the switch 30 from the ON position to the OFF position, then the control module 77 temporarily causes the switch 76 to close, and thus powers the coil 75. The coil 75 then generates an induced magnetic field.

If overheating is still present, the thermal resistor 72 presents a resistance Rth that is less than its value at the equilibrium temperature $T_{eq}$. Under such circumstances, the magnetic field induced by the coil 73 is greater than the magnetic field induced by the coil 75 so the bistable switch 78 remains in its second state. Power is not supplied again to the electronic card 12A and unwanted command signals cannot be issued, even after the switch 30 has been operated.

In contrast, if overheating is no longer present and the temperature has dropped below the equilibrium temperature $T_{eq}$ (e.g. the temperature has dropped to 125° C.), the thermal resistor 72 presents a resistance Rth that is greater than its value at the equilibrium temperature $T_{eq}$. Under such circumstances, the magnetic field induced by the coil 73 is less than the magnetic field induced by the coil 75, and the bistable switch 78 switches to its first state. The electronic card 12A is thus powered once more.

The operation of the power supply circuit 13B is the same as the operation of the power supply circuit 13A.

The invention claimed is:

1. A power supply circuit for electronic equipment that might be affected by overheating or by a fire, the power supply circuit comprising:
    an input terminal for receiving a power supply voltage (Va); and
    an output terminal for delivering the power supply voltage to the electronic equipment;
    the power supply circuit comprising:
    a bistable switch switchable between a first state in which the input terminal is connected to the output terminal, and a second state in which the input terminal is not connected to the output terminal;
    a first switch controlled by a cutoff signal that is connected between the input terminal and a series circuit comprising a thermal resistor and a first coil, said series circuit lying between said first switch and a ground terminal; and
    a second switch controlled by a reinitialization signal and a second coil in series with between the input terminal and the ground terminal;
    wherein, in the second state, the bistable switch connects the input terminal to the series circuit on its side remote from the ground terminal, and in the first state, the bistable switch does not connect the input terminal to the series circuit on its side remote from the ground terminal;
    the bistable switch being configured to switch to the first state when the magnetic field induced by the second coil is greater than the magnetic field induced by the first coil, and to switch to the second state when the magnetic field induced by the first coil is greater than the magnetic field induced by the second coil.

2. A power supply circuit according to claim 1, wherein the bistable switch comprises a first portion suitable for connecting the output terminal either to a first terminal connected to the input terminal or else to a floating second terminal, and a second portion suitable for connecting a third terminal that is connected to the series circuit either to a floating fourth terminal or else to a fifth terminal that is connected to the input terminal.

3. A power supply circuit according to claim 1, including a command module suitable for temporarily generating the reinitialization signal in response to a transition in a fuel cutoff signal.

4. An aeroengine computer comprising at least one power supply circuit according to claim 1 and an electronic card powered by said power supply circuit.

5. A computer according to claim 4, wherein the electronic card includes means for detecting overheating and means for generating said cutoff signal in response to detecting overheating.

6. An aircraft including a computer according to claim 4, and a switch operable by the pilot between a first position and a second position, wherein the power supply circuit includes a command module suitable for temporarily generating the reinitialization signal in response to a transition in the fuel cutoff signal representative of the position of the switch.

* * * * *